Patented July 20, 1937

2,087,599

UNITED STATES PATENT OFFICE 2,087,599

HORTICULTURAL OIL SPRAY

Edward B. Hunn, Cranford, N. J., assignor to Stanco, Inc., a corporation of Delaware No Drawing. Application September 8, 1932, Serial No. 632,188

6 Claims. (Cl. 167—24)

This invention relates to an improved horticultural oil spray and methods of making same and broadly, the invention comprises the addition of a pulverized vegetable matter containing insecticidal principles to an oil for use as a horticultural spray. "Oil" refers particularly to distillates from petroleum which may be (1) highly treated oils such as "white oils", or similar oils from which all phytocidal (toxic to foliage) ingredients have been removed; such combinations are used mainly as "summer" sprays for green foliage; (2) petroleum distillates which have not been subjected to vigorous refining processes such as so-called "spindle oils" or other distillates; ("Diamond paraffin", etc.) commonly used as "dormant" sprays, applied in spring prior to appearance of buds and foliage; (3) lighter distillates such as "kerosene".

One object of such a combination is to obtain decreased toxicity to the foliage and another object is to obtain a greater ease of emulsification of the oil.

In carrying out the invention, the powder containing a certain amount of insecticidal value in itself is mixed with the oil and is then emulsified with a relatively small amount of water to produce a stock emulsion which may later on be diluted for use in the field. Various types of vegetable insecticidal material may be used such as pyrethrum flowers, cube root, derris root, tobacco dust, etc.

It has been found quite economical to use as the source of vegetable matter the spent cake resulting from the extraction of vegetable insecticidal materials with solvents, but the invention is equally valuable for the utilization of pulverized dried vegetable material which has not been extracted by solvents. This applies particularly to derris and cube since it offers a very practical method of utilizing these materials, the extracts of which are practically insoluble in petroleum oils. The commercialization of these materials as insecticides has heretofore been retarded by the difficulty of getting the active principles into solution particularly in oil.

The principles of the invention may be applied commercially in a number of different ways. For example, the pulverized vegetable matter may either be mixed directly with oil and water as stated above and sold as a stock emulsion or this pulverized vegetable material might be sold separately alone or ground with the required amount of oil but not emulsified with any water. This would probably represent one of the most economical ways of furnishing the materials for the spray to the ultimate consumer who could then make up his own stock emulsion and then dilute at will. A preparation of this nature will also avoid the necessity of using a preservative which in other cases may be necessary as explained below.

If desired, a mutual solvent may be added to the oil for the purpose of facilitating solution of the pulverized insecticidal material in the oil. Generally speaking, it will not be necessary to add any separate emulsifier because many of the types of vegetable insecticidal plants already contain sufficient emulsifying ingredients. However, should the natural emulsifying capacity be insufficient, a small amount of other emulsifying agent may be added to the composition either being ground with the pulverized vegetable matter or added to the oil or added to the mixture when making up the stock emulsion. In any of the compositions mentioned in which water is one of the elements, it will generally be necessary or at least advisable to add a small amount of preservative such as cresylic acid (using enough to preserve the composition from fermentation).

Another phase of the invention is using a pulverized insecticidal material conjointly with some pulverized inert material such as wood pulp, bentonite, flour, etc., particularly in cases where the insecticidal material is too strong to be used alone in the desired quantity. In other words, the total pulverized material should be so adjusted in proportion of active insecticidal material and inert material that the mixture will contain the proper insecticidal power. It is also within the purview of the invention that in case the insecticidal material available, such as spent pyrethrum flowers for example, is not strong enough in insecticidal power, then some pulverized fresh insecticidal material of high strength may be mixed therewith in order to bring up the total strength to the desired figure.

Another modification of the invention comprises the addition of oil to the vegetable insecticidal matter prior to pulverizing the latter; the subsequent grinding operation then effects a very intimate association of the oil and insecticidal powder.

For the sake of illustration only and not desiring to be limited thereby, the following specific example is given of one way of carrying out the invention. Spent pyrethrum flowers containing approximately 10% oil residue extract from a previous extraction of the fresh flowers with oil are pulverized and mixed with water in the proportion of 1 part of flowers to 3 parts of water and about 2% of cresylic acid (based on the whole mixture) is added as a preservative. This mixture is, after proper agitation, suitable as a stock emulsion which will be ready for use with mere dilution with water.

Ground derris or cube root can be satisfactorily used in a composition similar to the above instead of the spent pyrethrum.

A number of advantages of the invention will be obvious to those skilled in the art. Among these are decreased toxicity to the foliage which is possibly explained by at least a partial absorption of the oil into the body of the pulverized material; second, greater ease of emulsification of the oil (the plant materials specified contain water-soluble ingredients which are "natural" emulsifiers for oil and water, thereby eliminating the necessity of adding such emulsifiers as soap, gum, etc.); third, the oil acting as a binder to retain the active powder on the foliage thereby prolonging its period of insecticidal effectiveness and fourth, elimination of the necessity of using special solvents for the active principle of the insecticidal material.

It is apparent that a number of variations may be made in carrying out the invention without departing from the scope thereof and it is therefore my intention to claim all inherent novelty in the invention as broadly as the prior art permits.

I claim:

1. An insecticide including, water, a suitable oil and finely powdered natural parts of a plant selected from the group consisting of derris and cube root containing an inherent emulsifier and properties toxic to insects.

2. An insecticide concentrate including, water, oil and finely powdered natural parts of a plant selected from the group consisting of derris and cube root containing an inherent emulsifier and properties toxic to insects, all mixed together in proportions to form a paste emulsion.

3. An insecticide emulsion including, water, a suitable oil, a preservative and finely powdered natural parts of a plant selected from the group consisting of derris and cube root containing an inherent emulsifier and properties toxic to insects, said emulsion being supplemented when said plant parts are reduced in amount as herein set forth by an auxiliary emulsifier such as colloidal clay in small amount.

4. A dilutable paste emulsion containing water, a suitable oil, finely powdered natural parts of a plant selected from the group consisting of derris and cube root, containing an inherent emulsifier consisting of the natural gums, resins and saponin of said plant parts and properties toxic to insects, said emulsion being supplemented when said plant parts are reduced in amount as herein set forth, by an auxiliary emulsifier such as colloidal clay in small amount.

5. An insecticide emulsion including, water, a suitable oil, a preservative and finely powdered natural parts of a plant selected from the group consisting of derris and cube root containing an inherent emulsifier and properties toxic to insects, said emulsion being supplemented when said plant parts are reduced in amount as herein set forth by an auxiliary emulsifier in small amount.

6. A dilutable paste emulsion containing water, a suitable oil, finely powdered natural parts of a plant selected from the group consisting of derris and cube root, containing an inherent emulsifier consisting of the natural gums, resins and saponin of said plant parts and properties toxic to insects, said emulsion being supplemented when said plant parts are reduced in amount as herein set forth, by an auxiliary emulsifier in small amount.

EDWARD B. HUNN.